United States Patent
Vöge et al.

(10) Patent No.: US 11,117,461 B2
(45) Date of Patent: Sep. 14, 2021

(54) DRIVE TRAIN AND OPERATING METHOD FOR A HYBRID VEHICLE WITH AN OVERRUN-ENABLED FORWARD GEAR

(71) Applicant: Volkswagen Aktiengesellschaft, Wolfsburg (DE)

(72) Inventors: Wolfgang Vöge, Braunschweig (DE); Jannis Zimmermann, Braunschweig (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 8 days.

(21) Appl. No.: 16/619,732

(22) PCT Filed: May 16, 2018

(86) PCT No.: PCT/EP2018/062706
§ 371 (c)(1),
(2) Date: Dec. 5, 2019

(87) PCT Pub. No.: WO2018/224258
PCT Pub. Date: Dec. 13, 2018

(65) Prior Publication Data
US 2020/0156458 A1    May 21, 2020

(30) Foreign Application Priority Data
Jun. 9, 2017 (DE) ............ 10 2017 209 765.5

(51) Int. Cl.
*B60W 10/06* (2006.01)
*B60K 6/48* (2007.10)
(Continued)

(52) U.S. Cl.
CPC ............... *B60K 6/48* (2013.01); *B60K 6/547* (2013.01); *B60K 6/442* (2013.01);
(Continued)

(58) Field of Classification Search
CPC .......... B60K 6/48; B60K 6/547; B60K 6/442; B60K 2006/4825; B60K 6/383;
(Continued)

(56) References Cited

U.S. PATENT DOCUMENTS

| 8,296,020 | B2* | 10/2012 | Lee | ............ B60K 6/445 |
| | | | | 701/51 |
| 2005/0065704 | A1* | 3/2005 | Glora | ............ F16H 61/21 |
| | | | | 701/93 |

(Continued)

FOREIGN PATENT DOCUMENTS

| DE | 102007016515 A1 | 10/2008 | ............ B60W 10/06 |
| DE | 102014209620 A1 | 12/2014 | ............ B60K 6/383 |

(Continued)

OTHER PUBLICATIONS

German Search Report, Application No. 102017209765.5, 8 pages, dated Jan. 12, 2018.
International Search Report and Written Opinion, Application No. PCT/EP2018/062706, 10 pages, dated Jul. 13, 2018.

*Primary Examiner* — David J Hlavka
(74) *Attorney, Agent, or Firm* — Slayden Grubert Beard PLLC

(57) ABSTRACT

The invention relates to a drive train for a hybrid vehicle with an internal combustion engine, with a transmission and with an electric machine, wherein the electric machine is arranged between the internal combustion engine and the transmission. The drive train can be provided in a simple, economical and/or space-saving manner in that the transmission comprises at least one overrun-enabled forward gear transmitting traction torque only and at least one overrun-free forward gear. A hybrid vehicle can be operated with a drive train of this kind easily and efficiently in that, when an overrun-enabled forward gear transmitting only traction torque is engaged and while the vehicle speed lies below a certain engagement speed for an overrun-free forward gear (Continued)

and at least one criterion for the presence of a driving torque is established or satisfied, the transmission is shifted into the overrun-free forward gear.

20 Claims, 1 Drawing Sheet

(51) Int. Cl.
  *B60K 6/547* (2007.10)
  *B60K 6/442* (2007.10)
(52) U.S. Cl.
  CPC ...... *B60K 2006/4825* (2013.01); *B60W 10/06* (2013.01); *B60W 2510/244* (2013.01); *B60W 2520/10* (2013.01); *B60W 2710/1005* (2013.01); *B60Y 2200/92* (2013.01)
(58) Field of Classification Search
  CPC ........... B60W 10/16; B60W 2510/244; B60W 2520/10; B60W 2710/1005; B60W 20/30; B60W 20/14; B60W 2030/18081; B60W 2540/10; B60W 2540/16; B60W 2552/15; B60W 30/18072; B60W 30/18127
  See application file for complete search history.

(56) References Cited

U.S. PATENT DOCUMENTS

| | | | |
|---|---|---|---|
| 2008/0017427 A1* | 1/2008 | Nakanowatari | B60W 10/115 180/65.235 |
| 2012/0071295 A1 | 3/2012 | Kato | 12/477 |
| 2012/0136518 A1 | 5/2012 | Samie et al. | 701/22 |
| 2012/0234133 A1* | 9/2012 | Ikegami | B60W 30/18136 74/661 |
| 2012/0234135 A1 | 9/2012 | Oki | 74/665 A |
| 2018/0244143 A1 | 8/2018 | Gollmer et al. | |

FOREIGN PATENT DOCUMENTS

| | | | |
|---|---|---|---|
| DE | 102010023093 B4 | 7/2016 | ............ B60K 6/383 |
| DE | 102015110839 A1 | 1/2017 | ............ B60K 1/00 |
| DE | 102015221779 A1 | 5/2017 | ............ B60K 6/547 |
| DE | 102015224058 A1 | 6/2017 | ............ B60K 6/30 |
| DE | 102017209765 A1 | 12/2018 | ............ B60K 6/383 |
| JP | 1182260 A | 3/1999 | ............ B60K 6/20 |
| JP | 2010162924 A | 7/2010 | ............ B60K 6/36 |
| JP | 2010179859 A | 8/2010 | ............ B60H 1/32 |
| JP | 2011157068 A | 8/2011 | ............ B60K 6/36 |
| WO | 2018/224258 A1 | 12/2018 | ............ B60K 6/383 |

\* cited by examiner

DRIVE TRAIN AND OPERATING METHOD FOR A HYBRID VEHICLE WITH AN OVERRUN-ENABLED FORWARD GEAR

CROSS-REFERENCE TO RELATED APPLICATIONS

This application claims priority to German Patent Application No. DE 10 2017 209 765.5, filed on Jun. 9, 2017 with the German Patent and Trademark Office. The contents of the aforesaid patent application are incorporated herein for all purposes.

TECHNICAL FIELD

The invention relates to a drive train for a hybrid vehicle and an operating method for a hybrid vehicle with such a drive train.

BACKGROUND

In hybrid vehicles, the drive train has an internal combustion engine and an electric machine. In addition, the drive train of hybrid vehicles can also have a transmission. In hybrid vehicles, the electric machine can be arranged or positioned in different places in the drive train.

A drive train for a hybrid vehicle is known from DE 10 2014 209 620 A1 that comprises an internal combustion engine, an electric machine, a transmission and a freewheel transmitting only traction torque. The electric machine is arranged between the internal combustion engine and the transmission, wherein the freewheel transmitting only traction torque is arranged between the internal combustion engine and the electric machine. It is proposed, insofar as no drag torque through recuperation is possible in drive operation when the battery is fully charged, to connect additional consumers so that the consumed power is greater than the recuperation power, or to use the vehicle brake. In a special embodiment, a mechanical coupling element is arranged parallel to the freewheel in the torque flow, which coupling element is inserted during drive operation to use or provide a drag torque by the internal combustion engine.

A drive train for a hybrid vehicle is known from DE 10 2010 023 093 B4 that comprises an internal combustion engine, an electric machine, a transmission and a freewheel. Here the transmission is arranged between the internal combustion engine and the electric machine, wherein the freewheel is arranged between the transmission and the electric machine or between the internal combustion engine and the transmission. The freewheel is preferably designed to be switchable and can be switched between a first rotational direction "open" and a second rotational direction "closed" which is opposite to the first.

The drive trains and operating methods known in the prior art, however, are not yet optimally designed. The drive trains known in the prior art usually have complex, costly and/or large transmissions. Also, additional components, such as in particular mechanical coupling elements, and complex components, such as freewheels that can be switched between multiple functions, are usually costly and/or require additional installation space. In addition, by connecting additional consumers to generate a drag torque through recuperation in drive operation when the battery is fully charged, typically only a low braking torque can be achieved and/or the additionally consumed energy can hardly be used in a sensible manner. Generating a drag torque in drive operation when the battery is fully charged by braking the vehicle wears out the brakes. In addition, the operating methods are usually strongly dependent on the configuration of the drive train, for example on the respective specific arrangement of the internal combustion engine, the electric machine and the transmission as well as other components, for example the freewheel, in relation to each other and can then not be simply transferred to differently configured drive trains.

SUMMARY

Therefore, an object exists to design and develop the drive train mentioned at the outset for a hybrid vehicle and the operating method for this such that the drive train can be provided in a simple, economical and/or in a space-saving manner and can be operated simply and efficiently.

The object is solved for the drive train for a hybrid vehicle by the features of the independent apparatus claim(s) and for the operating method for a hybrid vehicle with such a drive train by the features the independent method claim(s).

The details of one or more embodiments are set forth in the accompanying drawings and the description below. Other features will be apparent from the description, drawings, and from the claims.

DETAILED DESCRIPTION

Figure 1:
FIG. 1 shows a schematic representation of an embodiment of a drive train for a hybrid vehicle.

In a first aspect, the drive train has an internal combustion engine, a transmission and an electric machine. The electric machine is arranged functionally effectively between the internal combustion engine and the transmission.

The transmission may, e.g., have at least one overrun-enabled forward gear transmitting only traction torque and at least one overrun-free forward gear.

By using a freewheel that transmits traction torque, e.g., in the function of an overrunning clutch, as a switching element of a single, e.g., lower, gear, for example of the first forward gear, for example instead of a 1/N switching unit, the transmission and therefore the drive train may be produced or provided, e.g., its production optimized, in a simpler, more economical and/or more space-saving manner. For example, by using the freewheel for the gear equipped therewith, a sliding sleeve, a shift fork (1/N), a valve, a piston, a position sensor and/or a housing hole may be dispensed with.

For example, the transmission may have at least one overrun-enabled, low, e.g., first, forward gear transmitting only traction torque and at least one overrun-free, higher, e.g., second, forward gear.

In one embodiment, the drive train has a clutch, for example a K0 clutch, arranged functionally effectively between the internal combustion engine and the electric machine.

In another embodiment, the transmission is designed as a multi-stage transmission and/or as a dual-clutch transmission. For example, the transmission may be designed as a dual-clutch transmission with a first sub-transmission that may be coupled via a first transmission coupling and a second second sub-transmission that may be coupled via a second transmission coupling. For example the at least one overrun-enabled, for example low, e.g., first, forward gear transmitting only traction torque may be assigned to the first sub-transmission and/or coupled via the first transmission coupling. The at least one overrun-free, for example higher, e.g., second, forward gear may be assigned, e.g., to the second sub-transmission and/or coupled via the second transmission coupling.

The fact that the gear equipped with the freewheel can transmit only traction torque and, e.g., no driving torque can lead to a "change in driving behavior," for example in the case of operating at crawl speed, stop-and-go traffic, maneuvering, in this, for example first, gear. This can now be solved in a simple and efficient manner by the operating method with the features of the method claims.

The operating method may for example be designed for a hybrid vehicle with a drive train which has an internal combustion engine, a transmission and an electric machine, wherein the electric machine is arranged between the internal combustion engine and the transmission, as described above.

For example, in the method, when an overrun-enabled, for example low, e.g., first, forward gear of the transmission transmitting only traction torque is engaged and while the vehicle speed lies below a certain engagement speed for an overrun-free, for example higher, e.g., second, forward gear of the transmission and at least one criterion for the presence of a driving torque is established or satisfied, the transmission is shifted into the overrun-free, for example higher, in particular second, forward gear.

By shifting into the overrun-free, for example higher, in particular second, forward gear, a drag torque can now be generated which can be used, for example, to recuperate energy and/or to brake, for example by entraining the electric machine and/or the internal combustion engine. For example, the drag torque can be generated through a recuperation by the electric machine and/or by entraining the internal combustion engine.

In one embodiment, the overrun-enabled, e.g., low, forward gear transmitting only traction torque is the first forward gear of the transmission and/or the overrun-free, e.g., higher, forward gear is the second forward gear of the transmission.

In another embodiment, by shifting into the overrun-free, for example higher, e.g., second, forward gear, a drag torque is generated by the electric machine to recover energy and/or to brake the vehicle and/or by the internal combustion engine to brake the vehicle.

In another embodiment, the presence of a neutral accelerator pedal position, meaning a non-actuated accelerator pedal, is used as a criterion for the presence of a driving torque.

In another embodiment, the presence of a non-zero vehicle speed is used as a criterion for the presence of a driving torque.

In another embodiment, the presence of an inclination, such as driving downhill, of the vehicle is used as a criterion for the presence of a driving torque. For example, the presence of an inclination, e.g., driving downhill, may be established by means of a sensor system and/or a shift in wheel load and/or route information and/or map data, such as from a navigation system. For example, the presence of an inclination, e.g., driving downhill, of the vehicle may be detected when, over a certain period of time, the inclination is on average greater than a certain inclination threshold value, for example in percent.

In another embodiment, the presence of a difference in rotational speed ahead of and behind the freewheel is used as a criterion for the presence of a driving torque.

The criteria described above for the presence of a driving torque can be used, for example, individually or in combination with each other.

In another embodiment, the overrun-enabled, for example low, e.g., first, forward gear transmitting only traction torque is maintained over a defined duration and the transmission is only shifted into the overrun-free, for example higher, e.g., second, forward gear when the at least one criterion for the presence of a driving torque is still established or satisfied at the end of the defined duration, meaning drive operation is still present and/or a certain threshold value for this (for the duration) has been exceeded.

In the context of the method, the transmission can generally in principle be shifted into the overrun-free, for example higher, such as second, forward gear when a driving torque is present in the overrun-enabled, for example low, such as first, forward gear transmitting only traction torque.

In another embodiment, however, the charge level of a battery of the vehicle is established. For example, the "SOC" of the battery can be used to decide on a deceleration with the electric machine and/or the brake, such as wheel brake, of the vehicle.

For example, in the case of an incomplete charge of the battery, the transmission can be shifted into the overrun-free, for example higher, e.g., second, forward gear to brake the vehicle using a drag torque through recuperation by the electric machine.

In the case of a full charge of the battery, the vehicle can be braked, for example, by a brake, for example a wheel brake, of the vehicle. The overrun-enabled, for example low, such as first, forward gear transmitting only traction torque can thereby be maintained or the transmission can be shifted into the overrun-free, for example higher, such as second, forward gear. By shifting into the overrun-free, for example higher, such as second, forward gear, at least one drag torque can thereby also be used by the internal combustion engine to brake the vehicle and the wear of the vehicle brake can be reduced in this manner.

In another embodiment—for example in which the drive train has a clutch, e.g., a K0 clutch, between the internal combustion engine and the electric machine—the clutch, e.g., the K0 clutch, is opened to recuperate energy by means of the electric machine and/or closed to brake the vehicle by means of a drag torque by the internal combustion engine.

In another embodiment, when no criteria for the presence of a driving torque are established or satisfied, meaning no driving torque is established, the overrun-enabled, for example low, such as first, forward gear transmitting only traction torque is maintained, and when the vehicle speed lies below the certain engagement speed for the overrun-free, for example higher, such as second, forward gear, it is established once again whether at least one criterion for the presence of a driving torque is present or satisfied.

The disadvantages mentioned at the outset are therefore avoided and corresponding advantages are achieved.

There are now a plurality of opportunities to design and develop the drive train according to the present aspect and the operating method in a beneficial manner. For this purpose, reference is made initially to the claims that are subordinate to the independent apparatus claim and the independent method claim. In the following, another embodiment of the drive train and the operating method are described in greater detail with reference to the drawings and the accompanying description.

FIG. 1 shows that the drive train for a hybrid vehicle has an internal combustion engine VKM, a transmission G and an electric machine EM. The electric machine EM is arranged effectively between the internal combustion engine VKM and the transmission G. The transmission G has for example at least one overrun-enabled forward gear 1GF transmitting only traction torque and at least one overrun-free forward gear 2G. The transmission G may have for example at least one overrun-enabled, low forward gear 1GF transmitting only traction torque and at least one overrun-free, higher forward gear 2G. The at least one overrun-enabled forward gear 1GF transmitting only traction torque may for example be the first forward gear of the transmission G and the at least one overrun-free forward gear 1G may for example be the second forward gear of the transmission G.

FIG. 1 shows that the drive train also has a clutch K0, e.g., one known as a "K0 clutch," between the internal combustion engine VKM and the electric machine EM. By opening this clutch K0, the internal combustion engine VKM can be separated from the drive train, e.g., from the electric machine EM and the transmission G. This clutch K0 can be opened, e.g.,—for example depending on the idling speed of the internal combustion engine VKM—when engaging a gear, for example when engaging the overrun-free, for example second, forward gear 2G, such as below its engagement speed. To recuperate energy by means of the electric machine EM, the clutch K0 may for example be opened in order to recuperate more efficiently. To brake the vehicle by means of a drag torque by the internal combustion engine VKM, the clutch K0 may for example be closed in order to brake more efficiently and e.g., to reduce wear on the vehicle brakes.

The transmission G may be designed as a multi-stage transmission, for example as a dual-clutch transmission. Insofar as the transmission G is a dual-clutch transmission, the transmission G may, e.g., have a first sub-transmission that can be coupled via a first transmission coupling and a second sub-transmission that can be coupled via a second transmission coupling. For example, the at least one overrun-enabled, for example first, forward gear 1GF transmitting only traction torque can be assigned to the first sub-transmission and/or coupled via the first transmission coupling. The at least one overrun-free, for example second, forward gear 2G can, e.g., be assigned to the second sub-transmission and/or coupled via the second transmission coupling. Further forward gears and/or a backward gear can be present.

Figure 2:
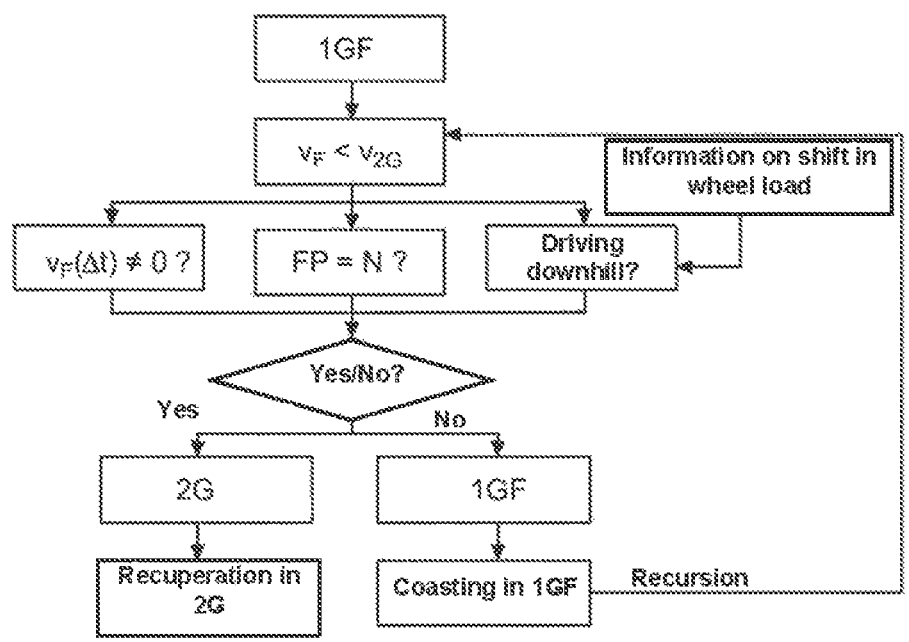
FIG. 2 shows a schematic representation of an embodiment of an operating method for a hybrid vehicle with a drive train as shown in FIG. 1.

FIG. 2 illustrates an embodiment of an operating method for a hybrid vehicle with a drive train as shown in FIG. 1 in a flow diagram.

FIG. 2 shows that, when driving forward, for example in a driving mode D, when an overrun-enabled, for example low, e.g., first, forward gear 1G of the transmission G transmitting only traction torque is engaged, it is established whether at least one criterion for the presence of a driving torque is present or satisfied, meaning, e.g., it is established whether or not driving operation is present for the vehicle, while the vehicle speed $v_F$ lies below a certain engagement speed $v_{2G}$ for an overrun-free, for example higher, e.g., second, forward gear 2G.

Establishing whether the vehicle speed $v_F$ lies below a certain engagement speed $v_{2G}$ for the overrun-free, e.g., second, forward gear 2G and whether at least one criterion for the presence of a driving torque is present or satisfied can occur either with an open or with a closed clutch K0.

Insofar as the transmission G is designed as a dual-clutch transmission and the overrun-enabled, e.g., first, forward gear 1G transmitting only traction torque is assigned to the first sub-transmission and the overrun-free, e.g., forward gear 2G is assigned to the second sub-transmission, the first transmission coupling can be closed and the second transmission coupling can be opened when the overrun-enabled forward gear 1G transmitting only traction torque is engaged.

FIG. 2 illustrates that the presence of a neutral accelerator pedal position FP (FP=N?) and/or the presence of a non-zero vehicle speed $v_F$ ($v_F(\Delta t) \neq 0$?) and/or the presence of the vehicle driving downhill (driving downhill?) can serve as a criterion for the presence of a driving torque. The presence of the vehicle driving downhill can be established by, among other things, information on a shift in wheel load. For example, the presence of driving downhill may be detected when, over a certain period of time, the inclination is on average greater than a certain inclination threshold value, for example in percent.

Optionally, the overrun-enabled, e.g., first, forward gear 1G transmitting only traction torque can be maintained over a defined duration $\Delta t$ and the transmission is only shifted into the overrun-free, e.g., second, forward gear 2G when the at least one criterion for the presence of a driving torque is still present or established at the end of the defined duration $\Delta t$ and/or exceeds a certain threshold value for this (for the duration).

FIG. 2 illustrated that, insofar as or respectively when one or more of these criteria are satisfied (yes), the transmission is shifted into the overrun-free, e.g., second, forward gear 2G. By shifting into the overrun-free, e.g., second, forward gear 2G, a drag torque can then be generated by the electric machine EM to recuperate energy and to brake the vehicle, e.g., also below the certain engagement speed $v_{2G}$ for the overrun-free, r.g., second, forward gear 2G. If the clutch K0 is open, the drag torque is generated by the electric machine EM only. In this way, e.g., a high recuperation can be achieved. Insofar as the clutch K0 is closed, the drag torque can be increased by entraining the internal combustion engine VKM and—at the cost of a low recuperation—a greater deceleration of the vehicle can be achieved.

FIG. 2 also illustrates that, insofar as or respectively when no criteria for the presence of a driving torque are established or satisfied (no), the overrun-enabled, e.g., first, forward gear 1G transmitting only traction torque is maintained and the method is repeated recursively in that it is established once again whether the vehicle speed $v_F$ lies below the certain engagement speed $v_{2G}$ for the overrun-free, e.g., second, forward gear 2G and whether at least one criterion for the presence of a driving torque is present or satisfied.

REFERENCE NUMBER LIST

VKM Internal combustion engine
G Transmission
EM Electric machine
K0 K0 clutch
1GF Overrun-enabled first forward gear transmitting only traction torque
2G Overrun-free second gear
$v_F$ Vehicle speed
$v_{2G}$ Engagement speed for second forward gear
FP Accelerator pedal position
N Neutral position of the accelerator pedal The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A drive train for a hybrid vehicle with an internal combustion engine, with a transmission and with an electric machine, wherein the electric machine is arranged between the internal combustion engine and the transmission, wherein the transmission has at least one overrun-enabled forward gear transmitting only traction torque between the electric machine and at least one wheel of the hybrid vehicle and at least one overrun-free forward gear.

2. The drive train of claim 1, wherein the transmission has at least one overrun-enabled, low forward gear transmitting only traction torque and at least one overrun-free, higher forward gear.

3. The drive train of claim 1, wherein the drive train has a K0 clutch arranged between the internal combustion engine and the electric machine; wherein the K0 clutch is operable to recuperate energy by means of the electric machine and/or is closed to brake the vehicle by means of a drag torque by the internal combustion engine.

4. The drive train of claim 1, wherein the transmission is designed as one or more of a multi-stage transmission and a dual-clutch transmission.

5. An operating method for a hybrid vehicle with a drive train of claim 1, wherein, when an overrun-enabled forward gear of the transmission transmitting only traction torque is engaged and while the vehicle speed is below a certain engagement speed for an overrun-free forward gear of the transmission and at least one criterion for the presence of a driving torque is established or satisfied, the transmission is shifted into the overrun-free forward gear.

6. The operating method of claim 5, wherein, by shifting into the overrun-free forward gear, a drag torque is generated by one or more of the electric machine, to recuperate energy and to brake the vehicle, and by the internal combustion engine to brake the vehicle.

7. The operating method of claim 5, wherein one of more of
the presence of a neutral accelerator pedal position, and
the presence of a non-zero vehicle speed, and
the presence of an inclination of a vehicle, and
the presence of a difference in rotational speed ahead of and behind the freewheel
is used as a criterion for the presence of a driving torque.

8. The operating method of claim 5, wherein the overrun-enabled forward gear transmitting only traction torque is maintained over a defined duration and the transmission is only shifted into the overrun-free forward gear when the at least one criterion for the presence of a driving torque is present or satisfied at the end of the defined duration and/or exceeds a certain threshold value for this.

9. The operating method of claim 5, wherein the charge level of a battery of the vehicle is established,
wherein in the case of an incomplete charge of the battery, the transmission is shifted into the overrun-free forward gear to brake the vehicle using a drag torque through recuperation by the electric machine, and/or
wherein in the case of a full charge of the battery, the vehicle is braked by a brake.

10. An operating method for a hybrid vehicle with a drive train with an internal combustion engine, a transmission, and an electric machine; wherein the electric machine is arranged between the internal combustion engine and the transmission; wherein, when an overrun-enabled forward gear of the transmission transmitting only traction torque is engaged and while a vehicle speed is below a certain engagement speed for an overrun-free forward gear of the transmission and at least one criterion for the presence of a driving torque is established or satisfied, the transmission is shifted into the overrun-free forward gear;
wherein the drive train has a K0 clutch between the internal combustion engine and the electric machine, wherein the K0 clutch is opened to recuperate energy by means of the electric machine and/or is closed to brake the vehicle by means of a drag torque by the internal combustion engine.

11. An operating method for a hybrid vehicle with a drive train with an internal combustion engine, a transmission, and an electric machine; wherein the electric machine is arranged between the internal combustion engine and the transmission; wherein, when an overrun-enabled forward gear of the transmission transmitting only traction torque is engaged and while a vehicle speed is below a certain engagement speed for an overrun-free forward gear of the transmission and at least one criterion for the presence of a driving torque is established or satisfied, the transmission is shifted into the overrun-free forward gear;
wherein the presence of an inclination of the vehicle is detected when, over a certain period of time, the inclination is on average greater than a certain inclination threshold value.

12. The operating method of claim 5, wherein, when no criterium for the presence of a driving torque is established or satisfied, the overrun-enabled forward gear transmitting only traction torque is maintained and, insofar as the vehicle speed is below the certain engagement speed) for the overrun-free forward gear, it is established once again whether at least one criterion for the presence of a driving torque is present or satisfied.

13. The operating method of claim 5, wherein the overrun-enabled forward gear transmitting only traction torque is a low forward gear of the transmission and the overrun-free forward gear is a higher forward gear of the transmission.

14. The operating method of claim 5, wherein the transmission is designed as one or more of a multi-stage transmission and as a dual-clutch transmission.

15. The drive train of claim 2, wherein the drive train has a K0 clutch arranged between the internal combustion engine and the electric machine; wherein the K0 clutch is operable to recuperate energy by means of the electric machine and/or is closed to brake the vehicle by means of a drag torque by the internal combustion engine.

16. The drive train of claim 2, wherein the transmission is designed as one or more of a multi-stage transmission and a dual-clutch transmission.

17. The drive train of claim 3, wherein the transmission is designed as one or more of a multi-stage transmission and a dual-clutch transmission.

18. The operating method of claim 6, wherein one of more of
- the presence of a neutral accelerator pedal position, and
- the presence of a non-zero vehicle speed, and
- the presence of an inclination of a vehicle, and
- the presence of a difference in rotational speed ahead of and behind the freewheel is used as a criterion for the presence of a driving torque.

19. The operating method of claim 6, wherein the overrun-enabled forward gear transmitting only traction torque is maintained over a defined duration and the transmission is only shifted into the overrun-free forward gear when the at least one criterion for the presence of a driving torque is present or satisfied at the end of the defined duration and/or exceeds a certain threshold value for this.

20. The operating method of claim 7, wherein the overrun-enabled forward gear transmitting only traction torque is maintained over a defined duration and the transmission is only shifted into the overrun-free forward gear when the at least one criterion for the presence of a driving torque is present or satisfied at the end of the defined duration and/or exceeds a certain threshold value for this.

\* \* \* \* \*